US012622443B2

(12) United States Patent
Gomes et al.

(10) Patent No.: US 12,622,443 B2
(45) Date of Patent: May 12, 2026

(54) COLD BREW BEVERAGE

(71) Applicant: Luigi Lavazza S.p.A., Turin (IT)

(72) Inventors: Joshua Gomes, Philadelphia, PA (US);
Anthony Loder, Collingswood, NJ
(US)

(73) Assignee: Luigi Lavazza S.p.A., Turin (IT)

( * ) Notice: Subject to any disclaimer, the term of this
patent is extended or adjusted under 35
U.S.C. 154(b) by 692 days.

(21) Appl. No.: 17/801,879

(22) PCT Filed: Feb. 19, 2021

(86) PCT No.: PCT/US2021/018697
§ 371 (c)(1),
(2) Date: Aug. 24, 2022

(87) PCT Pub. No.: WO2021/173435
PCT Pub. Date: Sep. 2, 2021

(65) Prior Publication Data
US 2023/0037212 A1 Feb. 2, 2023

Related U.S. Application Data

(60) Provisional application No. 62/981,298, filed on Feb.
25, 2020.

(51) Int. Cl.
*A23F 5/40* (2006.01)
*A23F 5/26* (2006.01)
*A47J 31/40* (2006.01)

(52) U.S. Cl.
CPC .............. *A23F 5/405* (2013.01); *A23F 5/26*
(2013.01); *A47J 31/404* (2013.01); *A47J*
*31/407* (2013.01)

(58) Field of Classification Search
CPC . A23F 5/405; A23F 5/26; A47J 31/404; A47J
31/407
See application file for complete search history.

(56) References Cited

U.S. PATENT DOCUMENTS

| | | | | |
|---|---|---|---|---|
| 4,100,306 A | * | 7/1978 | Gregg | .................... A23F 5/265 |
| | | | | 426/432 |
| 2013/0202768 A1 | | 8/2013 | Harabalioglu | |
| 2014/0178559 A1 | | 6/2014 | Neace, Jr. | |
| 2018/0098658 A1 | | 4/2018 | Angell et al. | |
| 2019/0274329 A1 | | 9/2019 | Mora et al. | |
| 2019/0274470 A1 | | 9/2019 | Curtis et al. | |
| 2019/0320677 A1 | | 10/2019 | Palzer et al. | |
| 2019/0374061 A1 | | 12/2019 | Ewing | |

FOREIGN PATENT DOCUMENTS

| | | |
|---|---|---|
| DE | 102009006399 | 7/2010 |
| GB | 1200700 | 7/1970 |
| JP | 2013524858 | 6/2013 |
| JP | 2016118549 | 6/2016 |
| JP | 2018508217 | 3/2018 |
| JP | 2018517490 | 7/2018 |
| JP | 2020501527 | 1/2020 |
| JP | 2020503848 | 2/2020 |
| WO | WO 2018/114580 A1 | 6/2018 |
| WO | WO 2018/115402 A1 | 6/2018 |

OTHER PUBLICATIONS

English translation of DE-4034923-A1 (Year: 1992).*
"How to Make Frappuccino-Style Blended Coffee Drinks" https://
joyofblending.com/make-frappuccino-blended-coffee-drinks/ May 27,
2016 (Year: 2016).*
Harada Hajime, "Guar Gum", Technical Journal on Food Chemistry
And Chemicals, Aug. 1, 2013, pp. 103-106, pp. 136-139, Japan.

* cited by examiner

Primary Examiner — Katherine D Leblanc
(74) Attorney, Agent, or Firm — The Belles Group, P.C.

(57) ABSTRACT

Described herein is a beverage preparation ingredient for
cold-brewing, the beverage preparation ingredient compris-
ing a blend of a water-insoluble drink powder and a water-
soluble drink powder.

19 Claims, No Drawings

COLD BREW BEVERAGE

CROSS-REFERENCE TO RELATED APPLICATIONS

This application is a U.S.C. § 371 National Stage Entry of Patent Cooperation Treaty Patent Application No. PCT/US21/18697 that claims the benefit of U.S. Provisional Patent Application No. 62/981,298 filed on Feb. 25, 2020. The disclosure of the above application(s) is (are) incorporated herein by reference.

BRIEF SUMMARY

According to some embodiments, the present invention is directed to a beverage preparation ingredient for cold-brewing, the beverage preparation ingredient comprising a blend of a water-insoluble drink powder and a water-soluble drink powder.

Other embodiments of the present invention include a beverage preparation capsule for cold-brewing, the beverage preparation capsule comprising a capsule body having a beverage preparation ingredient hermetically sealed therein, the beverage preparation ingredient comprising a blend of a water-insoluble drink powder and a water-soluble drink powder.

Other embodiments of the present invention include a method of cold-brewing a liquid product comprising: a) providing a beverage capsule comprising a capsule body having a beverage preparation ingredient hermetically sealed therein, the beverage preparation ingredient comprising a blend of a water-insoluble drink powder and a water-soluble drink powder; b) providing a machine for preparing a liquid product having a delivery assembly that comprises a brewing chamber configured for receiving one of said beverage capsules and for delivering the liquid products following upon contact between a supply fluid and the beverage preparation ingredient; c) inserting the beverage capsule into the delivery assembly of the machine; d) injecting the supply fluid into the beverage capsule to perform a brew cycle, whereby the supply fluid and beverage preparation ingredient form the liquid product; and e) ejecting the liquid product from the capsule body.

Other embodiments of the present invention include a method of cold-brewing a liquid product comprising: a) providing a beverage preparation ingredient comprising a blend of a water-insoluble drink powder and a water-soluble drink powder; and b) adding water to the beverage preparation ingredient to simultaneously hydrate the water-insoluble drink powder and extract the water-insoluble drink powder to form the liquid product.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means +/−5% of the reference value. According to the present application, the term "substantially free" less than about 0.1 wt. % based on the total of the referenced value.

The present invention is directed to a beverage preparation ingredient and a method forming a beverage therefrom by subjecting the beverage preparation ingredient to a cold-brewing process.

The beverage preparation ingredient may be in the form of a powder. The powder of the beverage preparation ingredient may have a particle size distribution that includes a d(0.1) value of about 170.8 μm; a d(0.5) value of about 407.0 μm; and a d(0.9) value of about 762.1 μm. The particle size distribution may be observed using a Malvern analysis. The d(0.1) value refers to up to 10% of the beverage preparation ingredient powder having a particle size equal to or less than about 170.8 μm; the d(0.5) value refers to up to 50% of the beverage preparation ingredient powder having a particle size equal to or less than about 407.0 μm (i.e., the median value); and the d(0.9) value refers to up to 90% of the beverage preparation ingredient powder having a particle size equal to or less than about 762.1 μm.

The beverage preparation ingredient powder may have a particle size that includes 2.5% below about 50 μm. The beverage preparation ingredient powder may have a particle size that includes 4.8% below about 90 μm. The beverage preparation ingredient powder may have a light obscuration value of about 4.2 μm.

The beverage preparation ingredient may comprise a blend of a water-insoluble drink powder and a water-soluble drink powder. The beverage preparation ingredient may further comprise one or more processing aids. The beverage preparation ingredient may have less than or equal to 5 wt. % of a liquid water moisture content. In some embodiments, the beverage preparation ingredient may be substantially free of liquid-water.

The water-insoluble drink powder may comprise a plant material that has been ground into the respective powder—also referred to as a "ground plant." The ground plant may comprise ground coffee bean. Non-limiting examples of ground coffee bean include roasted coffee bean that has been subjected to a grinding process.

The water-insoluble drink powder may have a particle size distribution that includes a d(0.1) value of about 218.8 µm; a d(0.5) value of about 497.6 µm; and a d(0.9) value of about 908.8 µm. The particle size distribution may be observed using a Malvern analysis. The d(0.1) value refers to up to 10% of the water-insoluble drink powder having a value equal to or less than about 218.8 µm; the d(0.5) value refers to up to 50% of the water-insoluble drink powder having a value equal to or less than about 497.6 µm (i.e., the median value); and the d(0.9) value refers to up to 90% of the water-insoluble drink powder having a value equal to or less than about 908.8 µm.

The water-insoluble drink powder may have a particle size that includes 2.7% below about 50 µm. The water-insoluble drink powder may have a particle size that includes 5.3% below about 90 µm. The water-insoluble drink powder may have a light obscuration value of about 3.7 µm.

The water-insoluble drink powder may be present in an amount ranging from about 50 wt. % to about 60 wt. % based on the total weight of the beverage preparation ingredient—including all percentages and sub-ranges there-between. In some embodiments, the water-insoluble drink powder may be present in an amount ranging from about 51 wt. % to about 55 wt. % based on the total weight of the beverage preparation ingredient—including all percentages and sub-ranges there-between. In some embodiments, the water-insoluble drink powder may be present in an amount ranging from about 52 wt. % to about 53 wt. % based on the total weight of the beverage preparation ingredient—including all percentages and sub-ranges there-between. In a non-limiting embodiment, the water-insoluble drink powder may be present in an amount of about 52.4 wt. % based on the total weight of the beverage preparation ingredient. In a non-limiting embodiment, the water-insoluble drink powder may be present in an amount of about 53.3 wt. % based on the total weight of the beverage preparation ingredient.

The water-soluble drink powder may comprise a dehydrated beverage brew. The dehydrated beverage brew may be a dehydrated coffee. Non-limiting examples of dehydrated coffee include coffee crystals formed from previously brewed coffee beans that have been prepared by free-drying or spray drying.

The water-soluble drink powder may have a particle size distribution that includes a d(0.1) value of about 59.1 µm; a d(0.5) value of about 301.4 µm; and a d(0.9) value of about 584.6 µm. The particle size distribution may be observed using a Malvern analysis. The d(0.1) value refers to up to 10% of the water-soluble drink powder having a value equal to or less than about 59.1 µm; the d(0.5) value refers to up to 50% of the water-soluble drink powder having a value equal to or less than about 301.4 µm (i.e., the median value); and the d(0.9) value refers to up to 90% of the water-soluble drink powder has a value equal to or less than about 584.6 µm.

The water-soluble drink powder may have a particle size that includes 8.5% below about 50 µm. The water-soluble drink powder may have a particle size that includes 11.7% below about 90 µm. The water-soluble drink powder may have a light obscuration value of about 6.4 µm.

The water-soluble drink powder may be present in an amount ranging from about 40 wt. % to about 50 wt. % based on the total weight of the beverage preparation ingredient—including all percentages and sub-ranges there-between. In some embodiments, the water-soluble drink powder may be present in an amount ranging from about 45 wt. % to about 49 wt. % based on the total weight of the beverage preparation ingredient—including all percentages and sub-ranges there-between. In some embodiments, the water-soluble drink powder may be present in an amount ranging from about 46 wt. % to about 47 wt. % based on the total weight of the beverage preparation ingredient—including all percentages and sub-ranges there-between. In a non-limiting embodiment, the water-soluble drink powder may be present in an amount of about 46.1 wt. % based on the total weight of the beverage preparation ingredient.

The water-insoluble drink powder and the water-soluble drink powder are present in a weight ratio ranging from about 1.0:1 to about 1.5:1—including all ratios and sub-ranges there-between. In some embodiments, the water-insoluble drink powder and the water-soluble drink powder are present in a weight ratio ranging from about 1.01:1 to about 1.25:1—including all ratios and sub-ranges there-between. In some embodiments, the water-insoluble drink powder and the water-soluble drink powder are present in a weight ratio ranging from about 1.05:1 to about 1.21:1—including all ratios and sub-ranges there-between. In a non-limiting example, the water-insoluble drink powder and the water-soluble drink powder are present in a weight ratio of about 1.14:1.

The processing aid may be present in an amount ranging from about 0.1 wt. % to about 2.0 wt. % based on the total weight of the beverage preparation ingredient—including all percentages and sub-ranges there-between. In some embodiments, the processing aid may be present in an amount ranging from about 0.1 wt. % to about 1.5 wt. % based on the total weight of the beverage preparation ingredient—including all percentages and sub-ranges there-between. In some embodiments, the processing aid may be present in an amount ranging from about 0.2 wt. % to about 1.0 wt. % based on the total weight of the beverage preparation ingredient—including all percentages and sub-ranges there-between. In some embodiments, the processing aid may be present in an amount ranging from about 0.2 wt. % to about 0.8 wt. % based on the total weight of the beverage preparation ingredient—including all percentages and sub-ranges there-between. In some embodiments, the processing aid may be present in an amount ranging from about 0.3 wt. % to about 0.8 wt. % based on the total weight of the beverage preparation ingredient—including all percentages and sub-ranges there-between. In some embodiments, the processing aid may be present in an amount ranging from about 0.3 wt. % to about 0.7 wt. % based on the total weight of the beverage preparation ingredient—including all percentages and sub-ranges there-between. In some embodiments, the processing aid may be present in an amount ranging from about 0.4 wt. % to about 0.6 wt. % based on the total weight of the beverage preparation ingredient—including all percentages and sub-ranges there-between. In some embodiments, the processing aid may be present in an amount ranging from about 0.5 wt. % to about 0.55 wt. % based on the total weight of the beverage preparation ingredient—including all percentages and sub-ranges there-between. In some embodiments, the processing aid may be present in an amount of about 0.5 wt. % based on the total weight of the beverage preparation ingredient—including all percentages and sub-ranges there-between.

In some embodiments, the processing aid may be present in an amount ranging from about 0.5 wt. % to about 1.5 wt. % based on the total weight of the water-insoluble drink powder—including all percentages and sub-ranges there-between. In some embodiments, the processing aid may be present in an amount ranging from about 0.9 wt. % to about 1.2 wt. % based on the total weight of the water-insoluble drink powder—including all percentages and sub-ranges there-between.

In some embodiments, the processing aid may be present in an amount ranging from about 0.7 wt. % to about 1.7 wt. % based on the total weight of the water-soluble drink powder—including all percentages and sub-ranges there-between. In some embodiments, the processing aid may be present in an amount ranging from about 1.0 wt. % to about 1.3 wt. % based on the total weight of the water-soluble drink powder—including all percentages and sub-ranges there-between.

The processing aid may comprise a gum. The gum may be a natural gum. The gum may be a natural seaweed extract selected from carrageenan, alginates, agar, agarose, fucellan and xantham gum. The gum may be a natural seed gum selected from guar gum, locust bean gum, tara gum, tamarind gum and psyllium gum. The gum may be a natural plant exudate selected from gum arabic, tragacanth, karaya and ghatti. The gum may be selected from a blend of two or more different gum.

In a non-limiting embodiment, the gum comprises a blend of guar gum and xantham gum. The guar gum and xantham gum may be present in a weight ratio ranging from about 2.5:1 to about 4.0:1—including all ratios and sub-ranges there-between. In some embodiments, the guar gum and xantham gum may be present in a weight ratio ranging from about 2.9:1 to about 3.6:1—including all ratios and sub-ranges there-between. The guar gum and xantham gum may be present in a weight ratio of about 3.3:1 to about 4:1—including all ratios and sub-ranges there-between. The guar gum and xantham gum may be present in a weight ratio of about 3.3:1.

According to the embodiments where the processing aid comprises guar gum and xantham gum, the guar gum may be present in an amount ranging from about 0.3 wt. % to about 0.6 wt. % and the xantham gum may be present in an amount ranging from about 0.05 wt. % to about 0.35 wt. %—based on the total weight of the beverage preparation ingredient—including all percentages and sub-ranges there-between. In some embodiments where the processing aid comprises guar gum and xantham gum, the guar gum may be present in an amount ranging from about 0.4 wt. % to about 0.5 wt. % and the xantham gum may be present in an amount ranging from about 0.1 wt. % to about 0.3 wt. %—based on the total weight of the beverage preparation ingredient—including all percentages and sub-ranges there-between. In some embodiments where the processing aid comprises guar gum and xantham gum, the guar gum may be present in an amount of about 0.42 wt. % and the xantham gum may be present in an amount of about 0.13 wt. %—based on the total weight of the beverage preparation ingredient—including all percentages and sub-ranges there-between.

In a non-limiting embodiment where the processing aid comprises guar gum and xantham gum, and the guar gum may be present in an amount ranging from about 0.8 wt. % to about 1.0 wt. % and the xantham gum may be present in an amount ranging from about 0.2 wt. % to about 0.4 wt. %—based on the total weight of the water-soluble drink powder—including all percentages and sub-ranges there-between. In a non-limiting embodiment where the process-ing aid comprises guar gum and xantham gum, the guar gum may be present in an amount of about 0.9 wt. % and the xantham gum may be present in an amount of about 0.27 wt. %—based on the total weight of the water-soluble drink powder.

In a non-limiting embodiment where the processing aid comprises guar gum and xantham gum, and the guar gum may be present in an amount ranging from about 0.8 wt. % to about 1.0 wt. % and the xantham gum may be present in an amount ranging from about 0.2 wt. % to about 0.4 wt. %—based on the total weight of the water-insoluble drink powder—including all percentages and sub-ranges there-between. In a non-limiting embodiment where the process-ing aid comprises guar gum and xantham gum, the guar gum may be present in an amount of about 0.86 wt. % and the xantham gum may be present in an amount of about 0.22 wt. %—based on the total weight of the water-insoluble drink powder.

The present invention further provides a beverage prepa-ration capsule that contains the beverage preparation ingre-dient. The beverage preparation capsule comprise a capsule body that forms a cavity for housing the beverage prepara-tion ingredient. Inside of the cavity, the capsule body her-metically seals the beverage preparation ingredient inside of the beverage preparation capsule. The beverage preparation capsule may further comprise a layer of nonwoven textile filtration material which at least partially surrounds and/or encapsulates the beverage preparation ingredient inside of the capsule body. The layer of non-woven textile filtration material may be in direct contact with the beverage prepa-ration ingredient inside of the beverage preparation capsule.

The present invention also provides for a method of cold-brewing a liquid product from the beverage preparation ingredient. The method comprises providing the beverage capsule that contains the beverage preparation ingredient. The method may further comprise providing a machine for preparing a liquid product having a delivery assembly that comprises a brewing chamber configured for receiving one of said beverage capsules and for delivering the liquid products following upon contact between a supply fluid and the beverage preparation ingredient.

The method may subsequently comprise inserting the beverage capsule into the delivery assembly of the machine. One inserted, the method may comprise injecting the supply fluid into the beverage capsule to perform a brew cycle, whereby the supply fluid and beverage preparation ingredi-ent form the liquid product. Specifically, this step may comprise injecting the supply fluid into the cavity formed by the capsule body such that the supply fluid mixes with the beverage preparation ingredient to commence the brew cycle. Finally, the method may comprise ejecting the liquid product from the capsule body. The liquid product may be a coffee. The liquid product may be ejected from the capsule body directly into a container—e.g., a drinking cup or insulated capped container.

The supply fluid may comprise water. In some embodi-ments, the supply fluid may consist essentially of water. In some embodiments, the supply fluid may consist of water. Non-limiting examples of water include spring water, dis-tilled water, and municipal water (also referred to as "tap water").

The supply fluid may be supplied to the beverage capsule to initiate the brew cycle at a temperature above freezing and at or below room temperature (23° C. to 25° C.). In some embodiments, the supply fluid may be supplied to the beverage capsule to initiate the brew cycle at a temperature ranging from about 1° C. to about 25° C.—including all temperatures and sub-ranges there-between. In some embodiments, the supply fluid may be supplied to the beverage capsule to initiate the brew cycle at a temperature ranging from about 1° C. to about 14° C.—including all temperatures and sub-ranges there-between. In some embodiments, the supply fluid may be supplied to the beverage capsule to initiate the brew cycle at a temperature less than about 14° C.

The term "brew cycle" refers to a period of time required for the beverage preparation ingredient to form the liquid product after exposure to the supply fluid. During the brew cycle the water-soluble drink powder may be hydrated and solubilized into the liquid product. During the brew cycle, the water-insoluble drink powder may be extracted to form part of the liquid product.

The brew cycle may occur during a time period that ranges from about 30 seconds to about 90 seconds—including all times and sub-ranges there-between. In some embodiments, the brew cycle may occur during a time period that ranges from about 45 seconds to about 75 seconds—including all times and sub-ranges there-between. In a non-limiting embodiment, the brew cycle may be about 60 seconds—including all times and sub-ranges there-between.

The brew cycle may occur while the beverage preparation ingredient is subjected to a brewing pressure ranging from about 2 PSI to about 10 PSI—including all pressures and sub-ranges there-between. In some embodiments, the brew cycle may occur while the beverage preparation ingredient is subjected to a brewing pressure ranging from about 4 PSI to about 8 PSI—including all pressures and sub-ranges there-between. The brew cycle may occur while the beverage preparation ingredient is subjected to a brewing pressure ranging from about 4.9 PSI to about 6.9 PSI—including all pressures and sub-ranges there-between.

The term "brewing pressure" refers to a pressure applied to the beverage preparation ingredient within the beverage capsule—specifically, within cavity formed by the capsule body. The brewing pressure may be applied by injecting pressurized air into the cavity formed by the capsule body.

EXAMPLES

An experiment was performed to test the impact of processing additives in the beverage preparation ingredient when brewed under cold-brew conditions. Two beverage preparation ingredients were prepared having compositions as set forth below in Table 1.

TABLE 1

| | Comparative Example 1 | Example 1 |
| --- | --- | --- |
| Water-Soluble Drink Powder | 45.9 wt. % | 46.1 wt. % |
| Water-Insoluble Drink Powder | 53.3 wt. % | 53.4 wt. % |
| Guar Gum | 0.7 wt. % | 0.4 wt. % |
| Xanthan Gum | — | 0.1 wt. % |
| Total | 100 wt. % | 100 wt. % |

Each of the beverage preparation ingredients of Comparative Example 1 and Example 1 were then subjected to identical cold-brewing processes by mixing with water at a temperature ranging from about 6° C. to 14 6° C. at a pressure of 4.88 PSI to about 6.86 PSI for a period of 60 seconds. The resulting cold-brew coffees were then evaluated for overall solubility—the results are set forth in Table 2 below

TABLE 2

| | Comparative Example 1 | Example 1 |
| --- | --- | --- |
| Solubility Test | Fail | Pass |

As demonstrated by Table 2, the beverage preparation ingredient according of Example 1 yielded a surprising result in that the addition of xanthan gum to guar gum in the processing aid yielded a superior solubility in the cold-brew beverage as compared to the poor solubility of the cold-brew beverage of Comparative Example 1, even though Example 1 used a greater amount of water-insoluble drink powder and less overall processing aid (i.e., the gum). Therefore, it has been discovered that using a processing aid of guar gum and xanthan gum yielded an unexpected improvement in drink solubility for cold-blend applications and allows for greater amounts of water-insoluble drink powder to be present, thereby enhancing the flavor profile of the resulting cold-brew beverage.

What is claimed is:

1. A beverage preparation ingredient for cold-brewing at a temperature ranging from about 1° C. to about 25° C., the beverage preparation ingredient comprising a blend of:
   a water-insoluble drink powder;
   a water-soluble drink powder; and
   a processing aid comprising a blend of guar gum and xanthan gum;
   wherein the guar gum and the xanthan gum are present in a weight ratio ranging from about 2.5:1 to about 4.0:1;
   wherein the water-insoluble drink powder and the water-soluble drink powder are present in a weight ratio ranging from about 1.05:1 to about 1.21:1; and
   wherein the processing aid is present in an amount ranging from about 0.2 wt. % to about 0.8 wt. % based on the total weight of the beverage preparation ingredient.

2. The beverage preparation ingredient according to claim 1, wherein the processing aid comprises a blend of guar gum and xanthan gum, wherein the guar gum and the xanthan gum are present in a weight ratio ranging from about 3.3:1 to about 4.0:1.

3. The beverage preparation ingredient according to claim 1, wherein the processing aid is present in an amount ranging from about 0.4 wt. % to about 0.6 wt. % based on the total weight of the beverage preparation ingredient.

4. The beverage preparation ingredient according to claim 1, wherein the water-insoluble drink powder comprises a ground plant.

5. The beverage preparation ingredient according to claim 1, wherein the water-insoluble drink powder has a particle distribution size that includes a d(0.1) value of about 218.8 μm; a d(0.5) value of about 497.6 μm; and a d(0.9) value of about 908.8 μm.

6. The beverage preparation ingredient according to claim 1, wherein the water-soluble drink powder comprises dehydrated drink brew.

7. The beverage preparation ingredient according to claim 1, wherein the water-soluble drink powder has a particle size distribution that includes a d(0.1) value of about 59.1 μm; a d(0.5) value of about 301.4 μm; and a d(0.9) value of about 584.6 μm.

8. The beverage preparation ingredient according to claim 1, wherein the weight ratio of the water-insoluble drink powder to the water soluble drink powder is about 1.14:1.

9. The beverage preparation ingredient according to claim 2, wherein the weight ratio of the guar gum to the xanthan gum is about 3.3:1.

10. The beverage preparation ingredient according to claim 1, wherein the processing aid is present in an amount ranging from about 0.3 wt. % to about 0.7, based on the total weight of the beverage preparation ingredient.

11. The beverage preparation ingredient according to claim 4, wherein the ground plant is ground coffee bean.

12. The beverage preparation ingredient according to claim 6, wherein the dehydrated drink brew is dehydrated coffee brew.

13. A beverage preparation capsule for cold-brewing, the beverage preparation capsule comprising a capsule body having the beverage preparation ingredient according to claim 1.

14. The beverage preparation capsule according claim 13, wherein the capsule further comprises a layer of nonwoven textile filtration material at least partially encapsulating the beverage preparation ingredient.

15. The beverage preparation capsule according claim 13, wherein the water-insoluble drink powder and the water-soluble drink powder are present in a weight ratio ranging from about 1.05:1 to about 1.21:1.

16. The beverage preparation capsule according claim 13, wherein the beverage preparation ingredient further comprises a processing aid comprising a blend of guar gum and xanthan gum, wherein the guar gum and the xanthan gum are present in a weight ratio ranging from about 2.5:1 to about 4.0:1.

17. The beverage preparation capsule according claim 13, wherein the water-insoluble drink powder has a particle distribution size that includes a d(0.1) value of about 218.8 μm; a d(0.5) value of about 497.6 μm; and a d(0.9) value of about 908.8 μm.

18. The beverage preparation capsule according claim 13, wherein the water-soluble drink powder comprises dehydrated coffee brew.

19. The beverage preparation ingredient according to claim 1, wherein the water-soluble drink powder may be present in an amount ranging from about 45 wt. % to about 49 wt. % based on the total weight of the beverage preparation ingredient.

* * * * *